United States Patent
Park et al.

(10) Patent No.: US 10,476,994 B2
(45) Date of Patent: Nov. 12, 2019

(54) DEVICES AND METHODS FOR TRANSMITTING/RECEIVING PACKET IN MULTIMEDIA COMMUNICATION SYSTEM

(71) Applicant: Samsung Electronics Co., Ltd., Suwon-si, Gyeonggi-do (KR)

(72) Inventors: Kyung-Mo Park, Seoul (KR); Hyeon-Cheol Pu, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/323,897

(22) PCT Filed: Jul. 6, 2015

(86) PCT No.: PCT/KR2015/006929
§ 371 (c)(1),
(2) Date: Jan. 4, 2017

(87) PCT Pub. No.: WO2016/003247
PCT Pub. Date: Jan. 7, 2016

(65) Prior Publication Data
US 2017/0142236 A1    May 18, 2017

(30) Foreign Application Priority Data
Jul. 4, 2014 (KR) .................. 10-2014-0083994

(51) Int. Cl.
*H04L 29/06* (2006.01)
(52) U.S. Cl.
CPC .......... *H04L 69/22* (2013.01); *H04L 65/4076* (2013.01); *H04L 65/607* (2013.01); *H04L 2212/00* (2013.01)

(58) Field of Classification Search
CPC ............................ H04L 69/22; H04L 65/4076
USPC ........................................................ 370/474
See application file for complete search history.

(56) References Cited

U.S. PATENT DOCUMENTS

| | | | |
|---|---|---|---|
| 7,965,708 B2 | 6/2011 | Cohen et al. | |
| 2007/0198897 A1 | 8/2007 | Schroeder | |
| 2011/0080873 A1 | 4/2011 | Zhang et al. | |
| 2011/0274156 A1 | 11/2011 | Mighani et al. | |

(Continued)

FOREIGN PATENT DOCUMENTS

| CN | 103621067 A | 3/2014 |
|---|---|---|
| CN | 103843351 A | 6/2014 |

(Continued)

OTHER PUBLICATIONS

Seo et al; Status and Prospect of MMT Technology Standardization for Hybrid Media Transmission; The Journal of KICS (Information & Communications Magazine); vol. 31 No. 4; Mar. 31, 2014.

(Continued)

*Primary Examiner* — Peter G Solinsky
(74) *Attorney, Agent, or Firm* — Jefferson IP Law, LLP

(57) ABSTRACT

The present invention relates to a method whereby a transmission device transmits a packet in a multimedia communication system, the method comprising the steps of: generating a packet; and transmitting the packet to a reception device, wherein the packet comprises two or more data units which can be independently decoded by the reception device, and one of the two or more data units comprises control information related to the packet.

4 Claims, 13 Drawing Sheets

(56) References Cited

U.S. PATENT DOCUMENTS

| | | | |
|---|---|---|---|
| 2012/0320925 A1* | 12/2012 | Park | H04L 65/607 370/400 |
| 2013/0086213 A1 | 4/2013 | Rhyu et al. | |
| 2013/0297822 A1 | 11/2013 | Park et al. | |
| 2014/0036999 A1* | 2/2014 | Ryu | H04N 19/50 375/240.12 |
| 2014/0108620 A1 | 4/2014 | Park et al. | |
| 2014/0109159 A1 | 4/2014 | Rhyu et al. | |
| 2015/0023355 A1* | 1/2015 | Tokumo | H04L 69/324 370/394 |
| 2015/0089560 A1 | 3/2015 | Park et al. | |
| 2015/0095727 A1* | 4/2015 | Cho | H04L 1/0002 714/708 |
| 2015/0113577 A1* | 4/2015 | Yie | H04N 21/2362 725/109 |
| 2015/0146797 A1* | 5/2015 | Lee | H04N 21/2387 375/240.25 |
| 2015/0201207 A1* | 7/2015 | Yie | H04N 21/234 375/240.26 |
| 2015/0296231 A1* | 10/2015 | Kwon | H04N 21/2362 725/116 |
| 2015/0373380 A1* | 12/2015 | Tsukagoshi | H04N 21/2362 725/109 |
| 2016/0192027 A1* | 6/2016 | Toma | H04N 21/42615 725/118 |
| 2016/0295257 A1* | 10/2016 | Iguchi | H04N 5/38 |
| 2016/0337091 A1* | 11/2016 | Kim | H04L 47/26 |
| 2017/0041423 A1* | 2/2017 | Kitazato | H04H 60/27 |
| 2017/0055025 A1* | 2/2017 | Lee | H04N 21/235 |
| 2017/0064341 A1* | 3/2017 | Oh | H04N 21/234 |
| 2017/0134774 A1* | 5/2017 | Iguchi | H04N 21/234 |
| 2017/0164043 A1* | 6/2017 | Lee | H04N 5/44 |
| 2017/0171606 A1* | 6/2017 | Lee | H04N 21/236 |

FOREIGN PATENT DOCUMENTS

| | | |
|---|---|---|
| JP | 2013-157820 A | 8/2013 |
| JP | 2014-503162 A | 2/2014 |
| KR | 10-2014-0018082 A | 2/2014 |
| KR | 10-2014-0051493 A | 5/2014 |
| WO | 2013/077670 A1 | 5/2013 |
| WO | 2013/162312 A1 | 10/2013 |
| WO | 2014/058285 A1 | 4/2014 |

OTHER PUBLICATIONS

ISO/IEC CD 23008-1, "Information technology—High efficiency coding and media delivery in heterogeneous environments—Part 1: MPEG media transport (MMT)", Jul. 20, 2012.

Japanese Office Action dated Jan. 22, 2019, issued in Japanese Patent Application No. 2017-500084.

Chinese Office Action dated Jul. 27, 2019, issued in Chinese Patent Application No. 201580036677.3.

* cited by examiner

DEVICES AND METHODS FOR TRANSMITTING/RECEIVING PACKET IN MULTIMEDIA COMMUNICATION SYSTEM

CROSS-REFERENCE TO RELATED APPLICATION(S)

The present application claims priority under 35 U.S.C. § 365 to International Patent Application No. PCT/KR2015/006929 filed Jul. 6, 2015, entitled "APPARATUS AND METHOD FOR TRANSMITTING/RECEIVING PACKET IN MULTIMEDIA COMMUNICATION SYSTEM", and, through International Patent Application No. PCT/KR2015/006929, to Korea Patent Application No. 10-2014-0083994 filed Jul. 4, 2014, each of which are incorporated herein by reference into the present disclosure as if fully set forth herein.

TECHNICAL FIELD

The present disclosure relates to an apparatus and method for transmitting/receiving a packet in a multimedia communication system, and more particularly, to an apparatus and method for transmitting/receiving a packet to support various packet formats in a multimedia communication system.

BACKGROUND ART

To satisfy the increasing demand for multimedia, various multimedia techniques have been proposed, among which a representative multimedia technology is a Moving Picture Experts Group (MPEG) media transport (MMT) technology.

The MMT technology is intended for transport and delivery of coded media data for multimedia services through a heterogeneous packet-switched network including Internet protocol (IP) networks and digital broadcasting networks. Herein, the coded media data may include timed audiovisual media data and non-timed data.

In the MMT technology, the coded media data is delivered through a packet-switched delivery network. In particular, in the MMT technology, characteristics of such a delivery environment, for example, a non-constant end-to-end delay of each packet from an MMT sending entity to an MMT receiving entity, are taken into account.

For efficient and effective delivery and consumption of coded media data through the packet-switched delivery networks, the MMT technology provides the following elements as will be described below.

First, the MMT technology provides a logical model that configures contents with components from various sources, for example, components of mash-up applications.

Second, the MMT technology provides formats that delivers information about the coded media data and enables delivery layer processing such as packetization.

Third, the MMT technology provides a packetization method and a structure of a packet for delivering media contents over packet-switched networks that support media and coding independent hybrid delivery through multiple channels.

Fourth, the MMT technology provides a format of signaling messages that manage delivery and consumption of media contents.

As stated above, the MMT technology has been proposed for efficient and effective media data delivery. Therefore, a packet configuration for media delivery plays an important role in the MMT technology.

However, the currently proposed MMT technology considers configuring a packet, but does take a scheme for configuring a packet into account in detail. Accordingly, a need exists for various schemes for configuring a packet in the MMT technology.

The above information is presented as background information only to assist with an understanding of the present disclosure. No determination has been made, and no assertion is made, as to whether any of the above might be applicable as prior art with regard to the present disclosure.

SUMMARY

An embodiment of the present disclosure provides an apparatus and method for transmitting/receiving a packet in a multimedia communication system.

An embodiment of the present disclosure also provides an apparatus and method for transmitting/receiving a packet to support various packet formats in a multimedia communication system.

An embodiment of the present disclosure also provides an apparatus and method for transmitting/receiving a packet based on media characteristics in a multimedia communication system.

An embodiment of the present disclosure also provides an apparatus and method for transmitting/receiving a packet based on a decoding unit that is decodable independently in a multimedia communication system.

An embodiment of the present disclosure also provides an apparatus and method for transmitting/receiving a packet to increase decoding efficiency in a multimedia communication system.

An embodiment of the present disclosure also provides an apparatus and method for transmitting/receiving a packet to increase decoding speed in a multimedia communication system.

A transmitting device in a multimedia communication system according to an embodiment of the present disclosure includes a sending unit configured to generate a packet and to transmit the packet to a receiving device, in which the packet includes at least two data units that are decodable independently by the receiving device, and one of the at least two data units includes control information related to the packet.

A receiving device in a multimedia communication system according to an embodiment of the present disclosure includes a receiving unit configured to receive a packet from a transmitting device and to decode the packet, in which the packet includes at least two data units that are decodable independently by the receiving device, and one of the at least two data units includes control information related to the packet.

Another receiving device in a multimedia communication system according to an embodiment of the present disclosure includes a receiving unit configured to receive a fragment generated by fragmenting a packet from a transmitting device, and a storage unit, in which the receiving device determines whether the fragment is a complete data unit, determines whether the fragment comprises control information if the fragment is a complete data unit, and stores the control information in a position preceding fragments received before the fragment of the storing unit, if the fragment comprises the control information.

A method for transmitting a packet by a transmitting device in a multimedia communication system according to an embodiment of the present disclosure includes generating a packet and transmitting the packet to a receiving device, in which the packet includes at least two data units that are decodable independently by the receiving device, and one of the at least two data units includes control information related to the packet.

Herein, a data unit including the control information related to the packet is located in a last one of the at least two data units in the packet.

Each of the at least two data units is fragmented or is not fragmented, and if each of the at least two data units is not fragmented, each of the at least two data units includes information about fragmentation of the data unit, and if each of the at least two data units is fragmented, each of fragments generated by the fragmentation of each of the at least two data units includes information about the fragmentation of the data unit.

The information about the fragmentation of the data unit includes one of information indicating that a payload includes one or more complete data units, information indicating that the payload includes a first fragment of the data unit, information indicating that the payload includes a fragment that is not either the first fragment of the data unit or a last fragment of the data unit, and information indicating the payload includes the last fragment of the data unit.

Each of the at least two data units is fragmented or is not fragmented, and if each of the at least two data units is not fragmented, each of the at least two data units includes information about a fragment type of the data unit, and if each of the at least two data units is fragmented, each of fragments generated by the fragmentation of each of the at least two data units includes information about the fragment type of the data unit.

The information about the fragment type of the data unit includes one of information indicating that a fragment includes the control information and information indicating that the fragment includes data.

If the multimedia communication system supports a Moving Picture Experts Group (MPEG) media transport (MMT) technology, the data unit is a media processing unit (MPU), and the information about the fragmentation of the data unit is a fragmentation indicator (f_i).

If the multimedia communication system supports the MMT technology, the data unit is an MPU and the information about the fragment type of the data unit is a fragment type (FT).

The control information includes one of MPU metadata and movie fragment metadata, and the information indicating that the fragment includes data indicates that the fragment is a media fragment unit (MFU).

A method for receiving a packet by a receiving device in a multimedia communication system according to an embodiment of the present disclosure includes receiving a packet from a transmitting device and decoding the packet, in which the packet includes at least two data units that are decodable independently by the receiving device, and one of the at least two data units includes control information related to the packet.

A data unit including the control information related to the packet is located in a last one of the at least two data units in the packet.

Each of the at least two data units is fragmented or is not fragmented, and if each of the at least two data units is not fragmented, each of the at least two data units includes information about fragmentation of the data unit, and if each of the at least two data units is fragmented, each of fragments generated by the fragmentation of each of the at least two data units includes information about the fragmentation of the data unit.

The information about the fragmentation of the data unit includes one of information indicating that a payload includes one or more complete data units, information indicating that the payload includes a first fragment of the data unit, information indicating that the payload includes a fragment that is not either the first fragment of the data unit or a last fragment of the data unit, and information indicating the payload includes the last fragment of the data unit.

Each of the at least two data units is fragmented or is not fragmented, and if each of the at least two data units is not fragmented, each of the at least two data units includes information about a fragment type of the data unit, and if each of the at least two data units is fragmented, each of fragments generated by the fragmentation of each of the at least two data units includes information about the fragment type of the data unit. The information about the fragment type of the data includes one of information indicating that a fragment includes the control information and information indicating that the fragment includes data.

If the multimedia communication system supports the MMT technology, the data unit is an MPU and the information about the fragmentation of the data unit is f_i.

If the multimedia communication system supports the MMT technology, the data unit is an MPU and the information about the fragment type of the data unit is FT.

The control information includes one of MPU metadata and movie fragment metadata, and the information indicating that the fragment includes data indicates that the fragment is an MFU.

Another method for receiving a packet by a receiving device according to an embodiment of the present disclosure includes receiving a fragment generated by fragmenting a packet from a transmitting device, determining whether the fragment is a complete data unit, determining whether the fragment includes control information if the fragment is a complete data unit, and storing the control information in a position preceding fragments received before the fragment, if the fragment includes the control information.

The fragment including the control information is a last fragment of fragments included in a packet including the fragment.

The determining of whether the fragment is the complete data unit includes determining whether the fragment is the complete data unit based on information about fragmentation of the fragment.

The information about the fragmentation includes one of information indicating that a payload includes one or more complete data units, information indicating that the payload includes a first fragment of the data unit including the fragment, information indicating that the payload includes a fragment that is not either the first fragment of the data unit or a last fragment of the data unit, and information indicating the payload includes the last fragment of the data unit.

The determining of whether the fragment includes control information if the fragment is the complete data unit includes determining whether the fragment is the complete data unit based on information about the fragment type of the fragment.

The information about the fragment type includes one of information indicating that a fragment includes the control information and information indicating that the fragment includes data.

If the multimedia communication system supports the MMT technology, the data unit is an MPU and the information about the fragmentation of the data unit is f_i.

If the multimedia communication system supports the MMT technology, the data unit is an MPU and the information about the fragment type of the data unit is FT. The control information includes one of MPU metadata and movie fragment metadata, and the information indicating that the fragment includes data indicates that the fragment is an MFU.

An embodiment of the present disclosure enables packet transmission/reception that supports various packet formats in a multimedia communication system.

An embodiment of the present disclosure also enables packet transmission/reception based on media characteristics in a multimedia communication system.

Moreover, an embodiment of the present disclosure makes it possible to perform packet transmission/reception based on a decoding unit that is decodable independently in a multimedia communication system.

Furthermore, an embodiment of the present disclosure enables packet transmission/reception that increases decoding efficiency in a multimedia communication system.

In addition, an embodiment of the present disclosure enables packet transmission/reception that increases decoding speed in a multimedia communication system.

BRIEF DESCRIPTION OF DRAWINGS

The above and other aspects, features and advantages of certain exemplary embodiments of the present disclosure will be more apparent from the following description taken in conjunction with the accompanying drawings, in which.

Throughout the drawings, similar reference numerals will be understood to refer to identical or similar elements, features, and structures.

Figure 1:
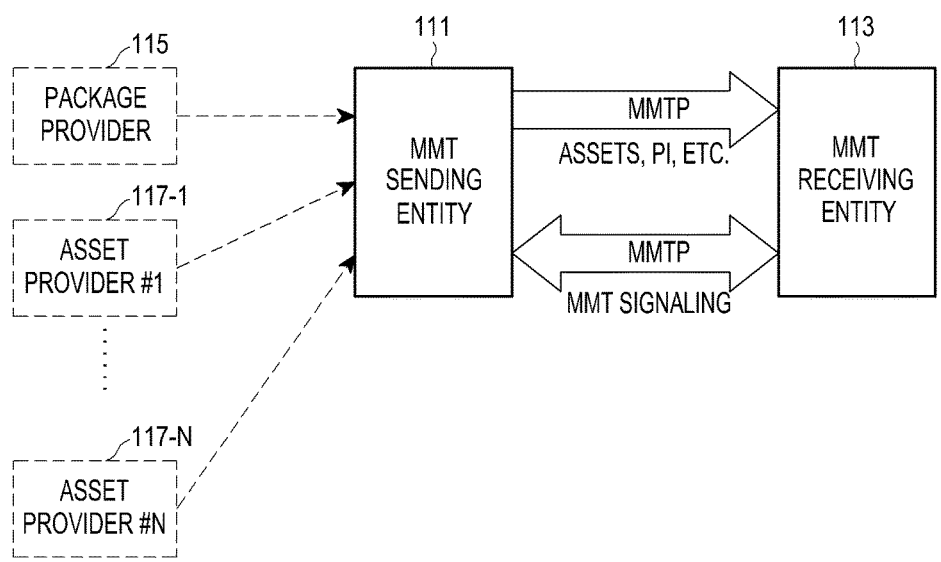
FIG. 1 illustrates a structure of an MMT communication system according to an embodiment of the present disclosure.

detailed description The following detailed description made referring to the accompanying drawings may help the comprehensive understanding of various embodiments of the present disclosure defined by claims and equivalents thereof. The following detailed description includes various specific details for understanding thereof, but these details will be regarded simply as examples. Therefore, those of ordinary skill in the art may recognize that various changes and modifications of various embodiments described herein may be made without departing from the scope and spirit of the present disclosure. In addition, a description of well-known functions and structures may be omitted for clarity and brevity.

Terms and words used in the following detailed description and claims are not limited to bibliographic meaning, but merely used by the inventor to enable a clear and consistent understanding of the present disclosure. Thus, it should be apparent to those of ordinary skill in the art that the following description of various embodiments of the present disclosure is provided merely for illustrative purposes, and not for purposes of limiting the present disclosure defined by the claims and their equivalents.

Although the terms such as "first" and "second" used in the various exemplary embodiments of the present disclosure may modify various elements of the various exemplary embodiments, these terms do not limit the corresponding elements. These terms may be used for the purpose of distinguishing one element from another element. For example, a first element may be named as a second element without departing from the right scope of the various exemplary embodiments of the present disclosure, and similarly, a second element may be named as a first element. The term "and/or" includes a combination of a plurality of related provided items or any one of the plurality of related provided items.

The terms used in the various exemplary embodiments of the present disclosure are for the purpose of describing particular exemplary embodiments only and are not intended to be limiting. The singular forms are intended to include the plural forms as well, unless the context clearly indicates otherwise. The term "include" or "has" used in the exemplary embodiments of the present disclosure is to indicate the presence of features, numbers, steps, operations, elements, parts, or a combination thereof described in the specifications, and does not preclude the presence or addition of one or more other features, numbers, steps, operations, elements, parts, or a combination thereof.

All of the terms used herein including technical or scientific terms have the same meanings as those generally understood by an ordinary skilled person in the related art unless they are defined other. The terms defined in a generally used dictionary should be interpreted as having meanings that are the same as or similar with the contextual meanings of the relevant technology.

An embodiment of the present disclosure proposes an apparatus and method for transmitting/receiving a packet in a multimedia communication system.

An embodiment of the present disclosure also proposes an apparatus and method for transmitting/receiving a packet to support various packet formats in a multimedia communication system.

An embodiment of the present disclosure also proposes an apparatus and method for transmitting/receiving a packet based on media characteristics in a multimedia communication system.

An embodiment of the present disclosure also proposes an apparatus and method for transmitting/receiving a packet based on a decoding unit that is decodable independently in a multimedia communication system.

An embodiment of the present disclosure also proposes an apparatus and method for transmitting/receiving a packet to increase decoding efficiency in a multimedia communication system.

An embodiment of the present disclosure also proposes an apparatus and method for transmitting/receiving a packet to increase decoding speed in a multimedia communication system.

In the following description, for convenience, a multimedia communication system to which an apparatus and method proposed in an embodiment of the present disclosure is applied is assumed to be a Moving Picture Experts Group (MPEG) media transport (MMT) system.

A decoding unit that is decodable independently may be any one of a media processing unit (MPU) and a media fragment unit (MFU). Any other data unit (DU) as well as the MPU and the MFU may also be a decoding unit that is decodable independently.

An apparatus and method proposed in an embodiment of the present disclosure is applicable to various communication systems including a mobile broadcast service, such as a digital multimedia broadcasting (DMB) service, a digital video broadcasting-handheld (DVP-H) service, an advanced television systems committee-mobile/handheld (ATSC-M/H) service, etc., a digital video broadcast system such as an Internet protocol television (IPTV) service, an MMT system, a Long-Term Evolution (LTE) mobile communication system, an LTE-Advanced (LTE-A) mobile communication system, a high speed downlink packet access (HSDPA) mobile communication system, a high speed uplink packet access (HSUPA) mobile communication system, a high rate packet data (HRPD) mobile communication system of the 3rd Generation Project Partnership 2 (3GPP2), a wideband code division multiple access (WCDMA) mobile communication system of the 3GPP2, a code division multiple access (CDMA) mobile communication system of the 3GPP2, an Institute of Electrical and Electronics Engineers (IEEE) 802.16m mobile communication system, an evolved packet system (EPS), a mobile IP system, and so forth.

With reference to FIG. 1, a structure of an MMT communication system according to an embodiment of the present disclosure will be described below.

FIG. 1 illustrates a structure of an MMT communication system according to an embodiment of the present disclosure.

Referring to FIG. 1, the MMT communication system may include an MMT sending (or transmitting) entity 111, an MMT receiving entity 113, a package provider 115, multiple asset providers, e.g., N asset providers #1 117-1 through #N 117-N. Communication is performed between the MMT sending entity 111 and the MMT receiving entity 113 according to an MMT protocol (MMTP). Herein, the MMTP will be described below.

The MMTP is an application layer transport protocol for packetizing and transmitting the MMT package, and is designed to efficiently and reliably transmit the MMT package. The MMTP supports improved characteristics such as media multiplexing, network jitter calculation, etc. Such characteristics enable efficient transmission of contents including media data coded into various types. The MMTP may operate on a higher layer of an existing network protocol, e.g., a user datagram protocol (UDP) or the IP, and supports various applications.

The MMT sending entity 111 may be an arbitrary entity that transmits media data, for example, an MMT broadcast server. The MMT receiving entity 113 may be an arbitrary entity that receives the media data, for example, a wireless device such as a mobile station (MS), a user equipment (UE), or the like. For example, if the MMT sending entity 111 is the MMT broadcast server and the MMT receiving entity 113 is the MS the MMT broadcast server may transmit media data to the MS via a base station. However, it should be noted that the base station is not illustrated separately.

The MMT sending entity 111 transmits packages as MMTP packet flows to the MMT receiving entity 113. Herein, the package indicates a logical collection of media data and is delivered using an MMT technology. The MMT sending entity 111 transmits assets, presentation information (PI), etc., to the MMT receiving entity 113 through MMTP packet flows. The assets and the PI will not be described in detail. The MMT sending entity 111 may be needed to obtain contents from content providers (not shown in FIG. 1) based on PI of a package provided by the package provider 115.

The MMT sending entity 111 and the MMT receiving entity 113 transmit/receive MMT signaling through MMTP packet flows.

The package provider 115 and the content providers may be located together. Media content is provided as an asset that is segmented into series of encapsulated MMT processing units forming an MMTP packet flow.

The MMTP packet flow of the media content is generated using related transport characteristics information. Signaling messages may be used to manage delivery and consumption of the packages.

The structure of the MMT communication system according to an embodiment of the present disclosure has been described with reference to FIG. 1, and next, referring to FIG. 2, a description will be made of a format of an MMT packet header and a format of an MMT payload header in the MMT communication system according to an embodiment of the present disclosure.

Figure 2:
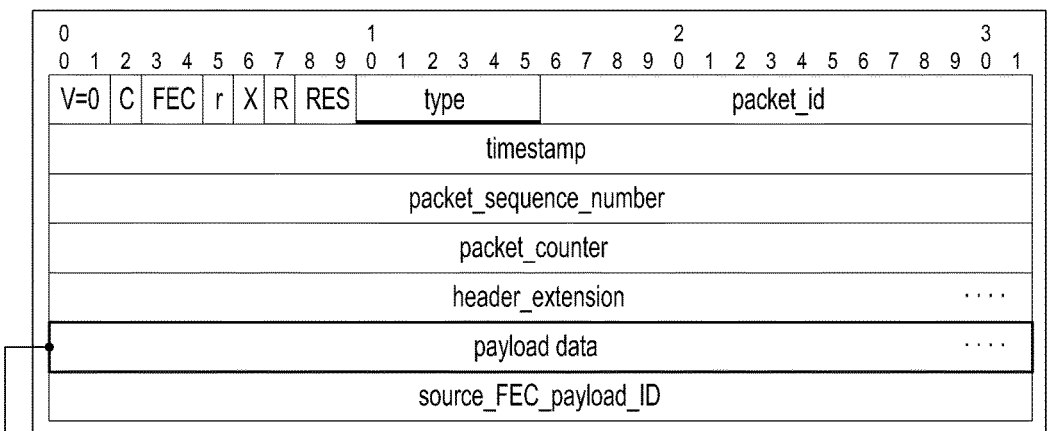
FIG. 2 illustrates a format of an MMT packet header and a format of an MMT payload header in an MMT communication system according to an embodiment of the present disclosure.
Figure 2:
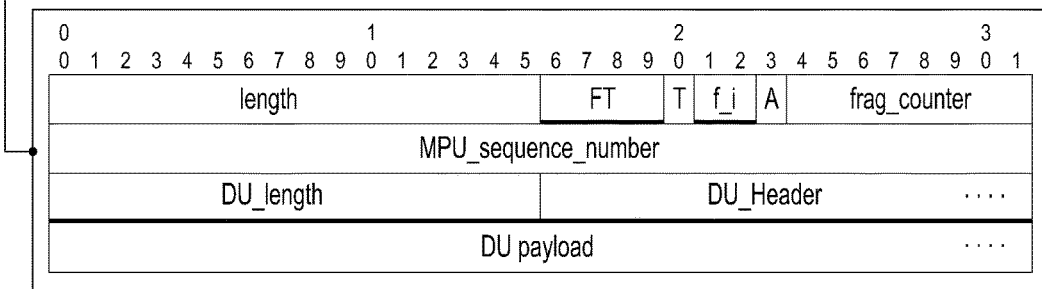

FIG. 2 illustrates a format of an MMT packet header and a format of an MMT payload header in an MMT communication system according to an embodiment of the present disclosure.

Referring to FIG. 2, the MMT communication system supports an MPU mode, a generic file delivery (GFD) mode, and so forth. The MMT communication system supports a packet transmission scheme through MPU mode setting based on media data attributes, for example, an importance of media data, information indicating whether media data is control information, information indicating whether media data is media information, and so forth.

In the MPU mode, an MMT packet header includes a V field, a C field, an FEC field, an r field, an X field, an R field, an RES field, a type field, a packet identifier (packet_id) field, a time stamp field, a packet_sequence_number field, a packet_counter field, a header_extension field, a payload data field, and a source forward error correction (FEC) payload identifier (ID) (source_FEC_payload_ID) field. Then, the V field, the C field, the FEC field, the r field, the X field, the R field, the RES field, the type field, the package_id field, the time stamp field, the packet_sequence_number field, a packet_counter field, a header_extension field, a payload data field, and the source_FEC_payload_ID field will be described, respectively.

The V field is a version field indicating a version number of MMTP and may be implemented with, for example, 2 bits.

The C field is a packet_counter_flag field and may be implemented with, for example, 1 bit. If a field value of the C field indicates 1, it means that there is the packet_counter field.

The FEC field is an FEC type field indicating a type of an FEC scheme used for error protection of MMTP packets. Here. The FEC field may be implemented, for example, with 2 bits, in which a field value '0' of the FEC field indicates a non-AL-FEC-protected MMTP packet, a field value '1' of the FEC field indicates an AL-FEC-protected MMTP packet, i.e., FEC source packet, a field value '2' of the FEC field indicates an MMTP packet for repair symbols, i.e., an FEC repair packet, and a field value '3' of the FEC field indicates reservation for future use.

The r field is a reserved field and may be implemented with, for example, 1 bit.

The x field is an extension_flag field and may be implemented with, for example, 1 bit. If a field value of the X field is set to, for example, 1, it means that there is the header_extension field.

The R field is an RAP flag (RAP_flag) field, and may be implemented with, for example, 1 bit. If the field value of the R field is set to, for example, 1, it means that the payload data field includes RAP regarding a data stream of the data type. The accurate meaning of the R field is defined by the data type.

The RES field is a reserved field and may be implemented with, for example, 2 bits.

The type field will be described in detail with reference to Table 1, and thus will not be described in detail.

The packet_id field is used to distinguish one asset from another asset, and may be implemented with, for example, 16 bits. The field value of the packet_id field is derived from an asset ID (asset_id) of an asset to which the MMT packet belongs, and will not be described in detail.

The time stamp field specifies a time instance of an MMTP packet based on UTC, and may be implemented with, for example, 32 bits. The time stamp field specifies a transmission time in the first byte of the MMTP packet, and will not be described in detail.

The packet_sequence_number field indicates an integer value used to distinguish packets having an identical packet_id, and may be implemented with, for example, 32 bits.

The packet_counter field indicates an integer value for counting MMTP packets, and may be implemented with, for example, 32 bits. The field value of the packet_counter field is increased by a preset value, for example, 1, regardless of corresponding packet_id each time when the MMTP packet is transmitted.

The header_extension field includes user-defined information and will not be described in detail.

The source FEC payload ID field is used when the field value of the FEC field is 1, and is added to the MMTP packet after AL-FEC protection.

The MMT payload header includes a length field, a fragment type (FT) field, a T field, a fragmentation indicator (f_i) field, an A field, a fragment counter (frag_counter) field, an MPU sequence number (MPU_sequence_number) field, a data unit length (DU_length) field, a DU header (DU_header) field, and a DU payload (DU_payload) field. Then, the length field, the T field, the A field, the frag_counter field, the MPU_sequence_number field, the DU_length field, and the DU_header field will be described, respectively. For reference, the FT field and the f_i field will be described with reference to Table 2 and Table 3, and thus will not be described in detail.

The length field indicates a length of a payload except for the length field, may be implemented with, for example, 16 bits.

The T field is a timed flag field indicating whether a fragment is generated from an MPU carrying timed media or from an MPU carrying non-timed media. The T field may be implemented with, for example, 1 bit, in which a field value '1' of the T field indicates that a fragment is generated from an MPU carrying timed media, and a field value '0' of the T field indicates a fragment is generated from an MPU carrying non-timed media.

The A field is an aggregation_flag field and may be implemented with, for example, 1 bit. If the field value of the A field is, for example, 1, it means that one or more DU, that is, multiple DUs, existing in the DU payload field are aggregated.

The frag_counter field indicates the number of payloads including fragments of consecutive identical DUs in the MMTP payload, and may be implemented with, for example, 8 bits. For example, if the field value of the A field is set to 1, the field value of the frag_counter field may be set to 0.

The MPU_sequence_number field indicates a sequence number of an MPU including a corresponding MPU fragment, and may be implemented with, for example, 32 bits.

The DU_length field indicates a length of data following the DU_length field, may be implemented with, for example, 16 bits.

The DU_header field indicates a header of the DU, and is based on the FT field.

The type field included in the MMT packet header will be described below.

First, the type field indicates a type of payload data included in the MMT packet header. The type field may be implemented with, for example, 6 bits, and is as shown in Table 1.

TABLE 1

| Value | Data type | Definition of data unit |
|---|---|---|
| 0x00 | MPU | a media-aware fragment of the MPU |
| 0x01 | Generic object | A generic object such as a complete MPU or an object of another type |
| 0x02 | signalling message | one or more signalling messages or a fragment of a signalling message |
| 0x03 | repair symbol | a single complete repair symbol |
| 0x04~0x1F | reserved for ISO use | |
| 0x20~0x3F | reserved for private use | |

As shown in Table 1, a field value '0x00' of the type field indicates that a payload data type is an MPU, a field value '0x01' of the type field indicates that the payload data type is a generic object, a field value '0x02' of the type field indicates that the payload data type is a signaling message, a field value '0x03' of the type field indicates that the payload data type is a repair symbol, field values '0x04' through '0x1F' of the type field indicate that the payload data type is reserved data for the International Organization for Standardization (ISO), and field values '0x20' through '0x3F' of the type field indicate that the payload data type is reserved data for private purposes.

Next, the FT field included in the MMT payload header will be described below.

The FT field may be implemented with, for example, 4 bits, and is as shown in Table 2.

TABLE 2

| FT | Description | Content |
|---|---|---|
| 0 | MPU metadata | contains the ftyp, mmpu, moov, and meta boxes as well as any other boxes that appear in between. |
| 1 | Movie fragment metadata | contains the moof box and the mdat box, excluding all media data inside the mdat box. |
| 2 | MFU | contains a sample or sub-sample of timed media data or an item of non-timed media data. |
| 3~15 | Reserved for private use | reserved |

As shown in Table 2, a field value '0' of the FT field indicates that the FT is MPU metadata, a field value '1' of the FT field indicates that the FT is movie fragment metadata, a field value '2' of the FT field indicates that the FT is an MFU, and field values '3' through '15' of the FT field indicate that the FT is reserved data for private purposes. Herein, the MPU metadata includes an ftyp box, an mmpu box, a moov box, and a meta box as well as another box, which will be described below in brief.

First, the ftyp box may include type information of media data.

Second, the mmpu box may include an ID of an asset to which a current MPU belongs and other information about the current MPU. In particular, the mmpu box may include information ("is complete") indicating whether the current MPU includes all MFUs.

Third, the moov box may include any codec configuration information for decoding and presentation of media data. More specifically, the moov box may include at least one media track 316 and an MMT hint track for MFUs. Herein, the MMT hint track may include information necessary for converting a media file including the MPU into a media stream packetized using a transport protocol such as the MMTP. That is, the MMT hint track may include information necessary for generating a plurality of MFUs forming one MPU. In particular, the MMT hint track may include priority information ("priority") of an MFU for the other MFUs included in one MPU and information ("dependency counter") about the number of MFUs decoded with reference to the MFU.

The movie fragment metadata may include a moof box except for all media data in a metadata box, and the metadata box, which will not described in detail. The MFU indicates a fragment of the MPU, and may include a sample or sub-sample of timed media data or an item of non-timed media data.

Next, the f_i field included in the MMT payload header will be described below.

The f_i field may include information about a fragment of a DU included in the payload. The f_i field may be implemented with, for example, 2 bits, and is as shown in Table 3.

TABLE 3

| Value | Description |
|---|---|
| '00' | Payload contains one or more complete data units. |
| '01' | Payload contains the first fragment of data unit. |
| '10' | Payload contains a fragment of data unit that is neither the first nor the last part. |
| '11' | Payload contains the last fragment of data unit. |

As shown in Table 3, a field value '00' of the f_i field indicates that a payload includes one or more complete DUs, a field value '01' of the f_i field indicates that a payload includes the first fragment of a DU, and a field value '10' of the f_i field indicates that the payload includes a fragment of a DU which is not either the first fragment or the last fragment, and a field value '11' of the f_i field indicates that the payload includes the last fragment of the DU.

The format of the MMT packet header and the format of the MMT payload header in the MMT communication system according to an embodiment of the present disclosure have been described with reference to FIG. 2, and next, referring to FIG. 3, a description will be made of a process of transmitting a multimedia file including time information in the MPU mode in the MMT communication system according to an embodiment of the present disclosure.

Figure 3:
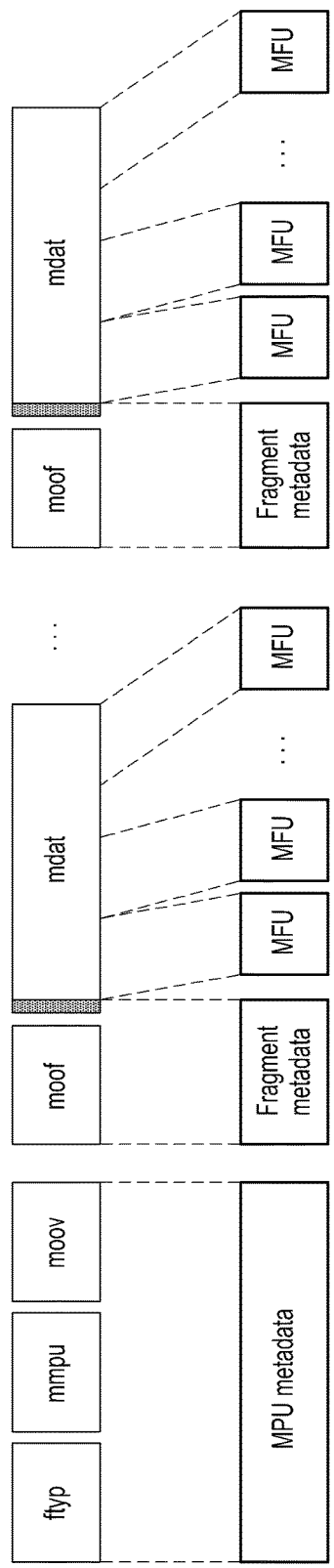
FIG. 3 illustrates a process of transmitting a multimedia file including time information in an MPU mode in an MMT communication system according to an embodiment of the present disclosure.

FIG. 3 illustrates a process of transmitting a multimedia file including time information in an MPU mode in an MMT communication system according to an embodiment of the present disclosure.

Referring to FIG. 3, the MMTP supports a streaming mode and a download mode, in which the streaming mode is optimized for packetized streaming of ISO base media file formatted files, and the download mode considers smooth delivery of the generic file. Herein, the streaming mode is an MPU mode and the download mode is a GFD mode.

The MPU mode will be described below.

In the MPU mode, delivery of MPUs to MMT receiving entities using the MMTP causes packetization in an MMT sending entity and depacketization in an MMT receiving entity. The packetization converts an MPU into a set of MMTP payloads carried in MMTP packets. A format of an MMTP payload considers fragmentation of the MMTP payload, which enables delivery of relatively large payloads. The format of the MMTP payload also considers aggregation of multiple MMTP payload DUs into a single MMTP payload to fit into smaller DUs. In the MMT receiving entity, the depacketization is performed to recover the original MPU data. Several depacketization modes are defined to address other requirements of overlaying applications.

If a field value of the payload data type is 0x00, an MPU is fragmented in a media aware way in which a transport layer allows identification of characteristics and priority of a fragment which is carried. Herein, the fragment of the MPU may be MPU metadata, movie fragment metadata, an MFU, or a non-timed media data item.

As shown in FIG. 3, the MPU mode supports packet transmission considering media decoding, and thus, as is shown, a multimedia file including time information such as audio, video, etc., is transmitted. That is, as shown in FIG. 3, when the MMT communication system supports the MPU mode, media control information, that is, the ftyp box, the mmpu box, the moov box, and the moof box are transmitted separately from media information in the MPU mode.

The process of transmitting a multimedia file including time information in the MPU mode in the MMT communication system according to an embodiment of the present disclosure has been described with reference to FIG. 3, and next, referring to FIG. 4, a description will be made of a process of transmitting a multimedia file not including time information in the MPU mode in the MMT communication system according to an embodiment of the present disclosure.

Figure 4:
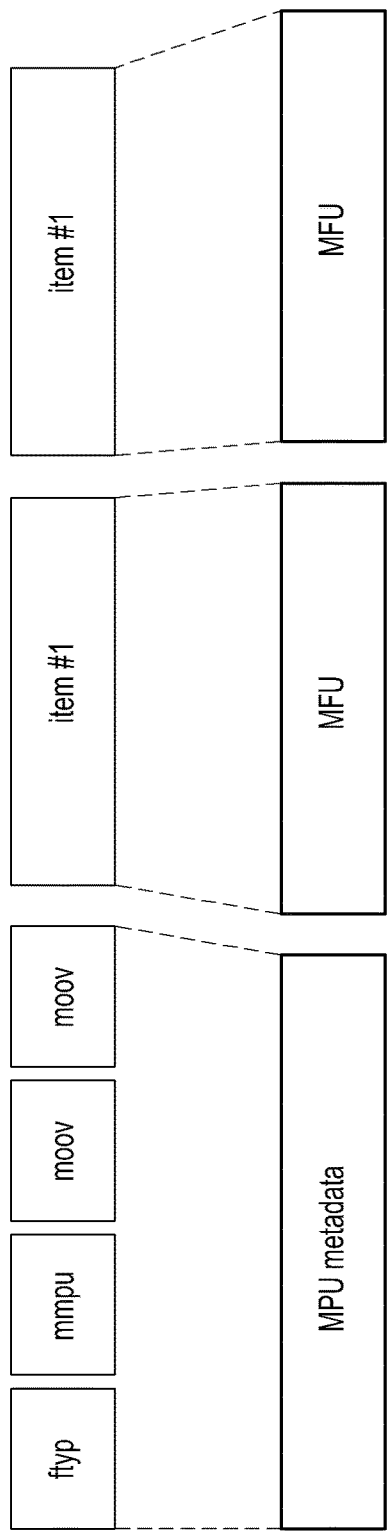
FIG. 4 illustrates a process of transmitting a multimedia file not including time information in an MPU mode in an MMT communication system according to an embodiment of the present disclosure.

FIG. 4 illustrates a process of transmitting a multimedia file not including time information in an MPU mode in an MMT communication system according to an embodiment of the present disclosure.

As shown in FIG. 4, in the MPU mode, a multimedia file not including time information such as an image, a web image, a widget, etc., is transmitted. That is, as shown in FIG. 4, when the MMT communication system supports the MPU mode, media control information, that is, the ftyp box, the mmpu box, the moov box, and the meta box are transmitted separately from media information in the MPU mode.

The process of transmitting a multimedia file not including time information in the MPU mode in the MMT communication system according to an embodiment of the present disclosure has been described with reference to FIG. 4, and next, referring to FIG. 5, a description will be made of a process of transmitting a packet based on multimedia characteristics in the MMT communication system according to an embodiment of the present disclosure.

Figure 5:
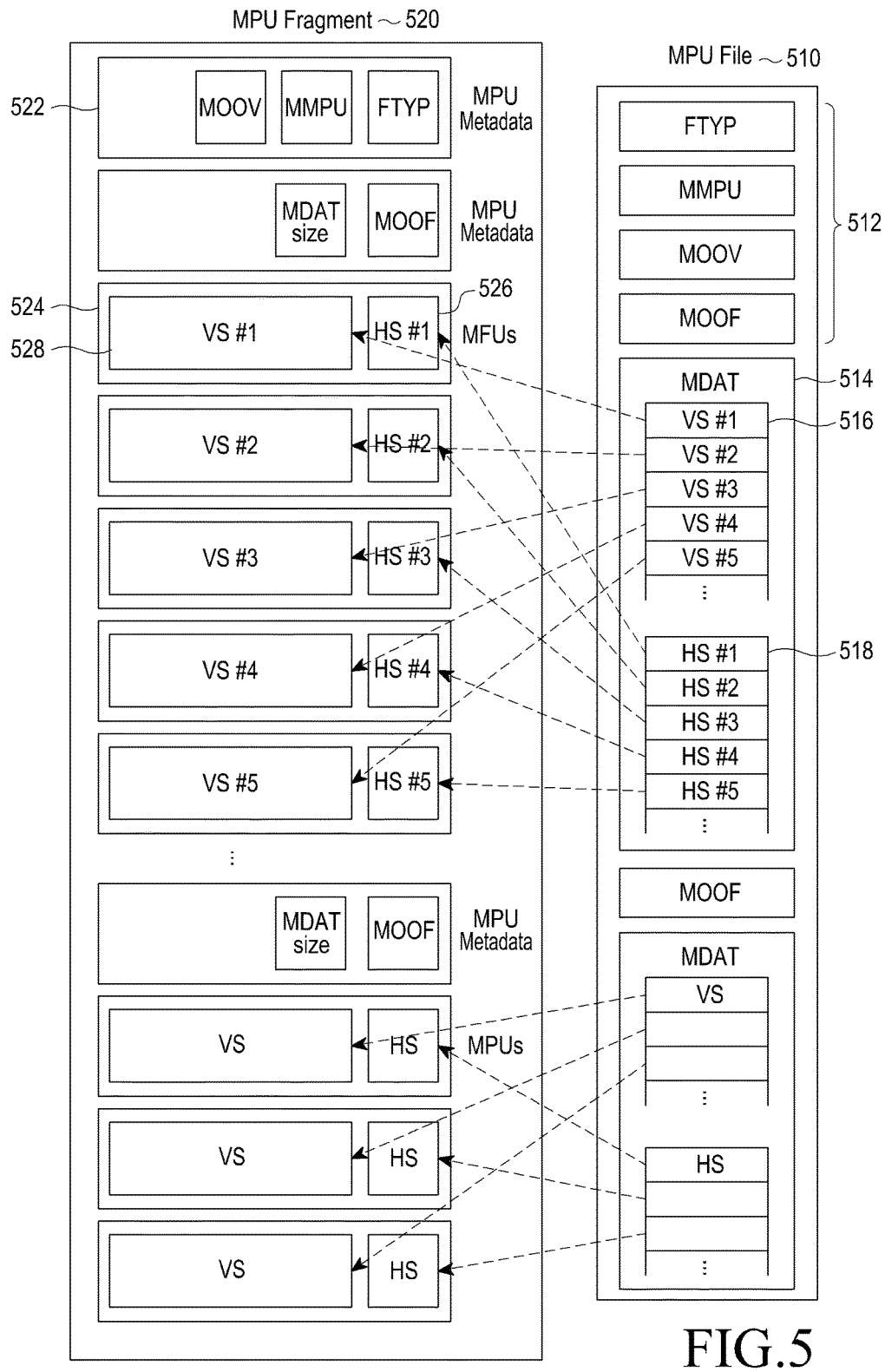
FIG. 5 illustrates a process of transmitting a packet based on multimedia characteristics in an MPU mode in an MMT communication system according to an embodiment of the present disclosure.

FIG. 5 illustrates a process of transmitting a packet based on multimedia characteristics in an MPU mode in an MMT communication system according to an embodiment of the present disclosure.

Referring to FIG. 5, an MPU file 510 means the data that an encapsulation function layer desires to transmit, and an MFU fragment 520 corresponds to a data structure for configuring transmission data. The MPU file 510 may include header information 512, such as a file type (FTYP) box indicating a file type, an MMPU box indicating a configuration of an MPU, a MOOV box indicating codec configuration information, and a movie fragment (MOOF) box, and an MDAT box 514 including video samples (VS) 516 and MMT hint samples (HS) 518. Herein, the MMPU box indicates that a type of data stored in the MDAT box is an MPU, and the MOOV box includes information about media frames stored in the MDAT box. The MFU fragment 520 may include MPU metadata 522 including an FTYP box, an MMPU box, and an MOOV box, MPU metadata including an MOOF box and an MDAT size, and MFUs 524 including pairs of HS 526 and VS 528 related to the MPU metadata.

An MMT payload is configured based on the MFU fragment 520 and is transmitted through an MMT packet.

Herein, a process of configuring the MMT payload will be described below.

First, a data configurer (not shown in FIG. 5) analyzes transmission data 510 in an MPU file format delivered from a data generator (not shown in FIG. 5) to determine a type, configuration information of an MPU, configuration information of a codec, and start and size (length) information of data from header information 512 of the MPU file 510. The data configurer analyzes the structure of the MFUs (the VSs of FIG. 5) 516 and the MFU HSs 518 constituting the MPU file 510, to determine an MFU header containing the size, mutual priority and interconnection information (e.g., length, etc.) of each MFU, and MFU data which is the actual media data, and analyzes the size of each MFU based on the MFU HSs 518 indicating the starting offset and length of each MFU. Based on the analyzed MPU type, the MFU fragment 520 for configuring a transport packet is configured. The MFU HSs 518 form an MFU header of the MFU fragment 520. The data configurer configures each MFU as a transmission unit based on the size of each MFU that is analyzed from the MFU HSs 518. In this case, depending on the size of the MFU, one or multiple payloads may be configured.

The process of transmitting a packet based on multimedia characteristics in the MMT communication system according to an embodiment of the present disclosure has been described with reference to FIG. 5, and next, referring to FIG. 6, a description will be made of a process of transmitting a packet based on FT and f_i in the MMT communication system according to an embodiment of the present disclosure.

Figure 6:
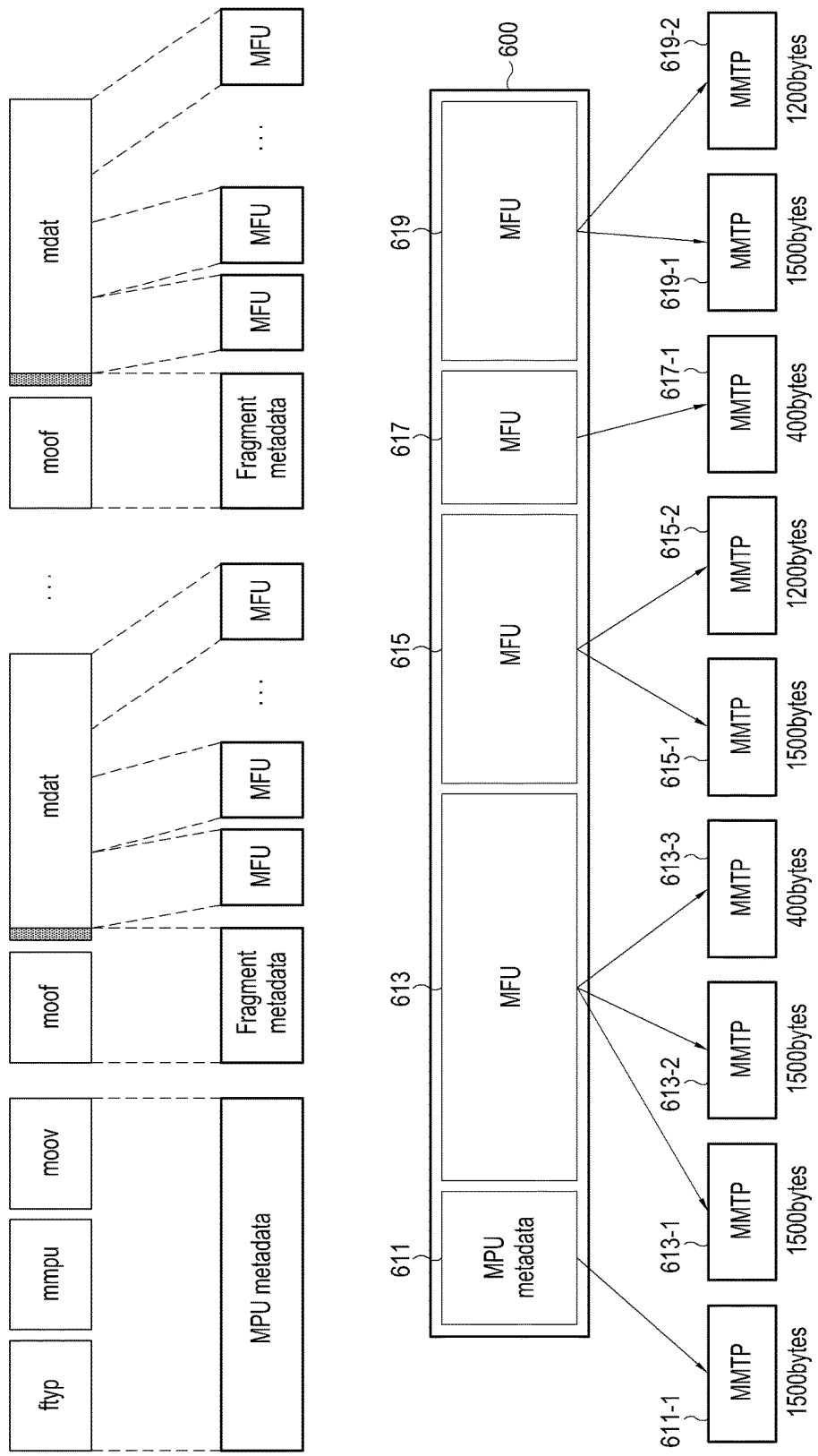
FIG. 6 illustrates a process of transmitting a packet based on FT and f_i in an MMT communication system according to an embodiment of the present disclosure.

FIG. 6 illustrates a process of transmitting a packet based on FT and f_i in an MMT communication system according to an embodiment of the present disclosure.

Referring to FIG. 6, a packet 600 is generated based on FT and f_i, generated considering MFU processing, and generated for transmission of large-volume contents, e.g., 4K contents. That is, the packet 600 may include MPU metadata 611, and at least one MFU, e.g., four MFUs, i.e., an MFU 613, an MFU 615, an MFU 617, and an MFU 619. Herein, the MFU is assumed to be fragmented if a size thereof exceeds a size of an MTU, e.g., 1500 bytes.

The MPU metadata 611 may include one MMTP packet 611-1. The MMTP packet 611-1 may include a packet type, FT, and f_i. Herein, the MPU metadata 611 is generated with one MMTP packet, without being fragmented, such that a value of f_i included in the MMTP packet 611-1 is set to 00. A packet type included in the MMTP packet 611-1 is set to an MPU, and an FT included in the MMTP packet 611-1 is set to metadata. Herein, a size of the MMTP packet 611-1 is 1500 bytes.

The MFU 613 may include three MMTP packets, i.e., an MMTP packet 613-1, an MMTP packet 613-2, and an MMTP packet 613-3. Each of the MMTP packet 613-1, the MMTP packet 613-2, and the MMTP packet 613-3 may include a packet type, FT, and f_i. Herein, the MFU 613 is fragmented into the MMTP packet 613-1, the MMTP packet 613-2, and the MMTP packet 613-3, such that a value f_i of the MMTP packet 613-1 is set to 01, the value f_i of the MMTP packet 613-2 is set to 10, and the value f_i of the MMTP packet 613-3 is set to 11. The packet type included in each of the MMTP packet 613-1, the MMTP packet 613-2, and the MMTP packet 613-3 is set to an MPU, and the FT included in each of the MMTP packet 613-1, the MMTP packet 613-2, and the MMTP packet 613-3 is set to an MFU. Herein, the size of the MMTP packet 613-1 is 1500 bytes, the size of the MMTP packet 613-2 is 1500 bytes, and the size of the MMTP packet 613-3 is 400 bytes.

The MFU 615 may include two MMTP packets, i.e., an MMTP packet 615-1 and an MMTP packet 615-2. Each of the MMTP packet 615-1 and the MMTP packet 615-2 may include a packet type, FT, and f_i. Herein, the MFU 615 is fragmented into the MMTP packet 615-1 and the MMTP packet 615-2, such that a value f_i of the MMTP packet 615-1 is set to 01 and the value f_i of the MMTP packet 615-2 is set to 11. The packet type included in each of the MMTP packet 615-1 and the MMTP packet 615-2 is set to an MPU, and the FT included in each of the MMTP packet 615-1 and the MMTP packet 615-2 is set to an MFU. Herein, the size of the MMTP packet 615-1 is 1500 bytes, and the size of the MMTP packet 615-2 is 1200 bytes.

The MFU 617 may include one MMTP packet 617-1. The MMTP packet 617-1 may include a packet type, FT, and f_i. Herein, the MFU 617 is generated with one MMTP packet, without being fragmented, such that the value of f_i included in the MMTP packet 617-1 is set to 00. The packet type included in the MMTP packet 617-1 is set to an MPU, and an FT included in the MMTP packet 617-1 is set to an MFU. Herein, the size of the MMTP packet 617-1 is 400 bytes.

The MFU 619 may include two MMTP packets, i.e., an MMTP packet 619-1 and an MMTP packet 619-2. Each of the MMTP packet 619-1 and the MMTP packet 619-2 may include a packet type, FT, and f_i. Herein, the MFU 619 is fragmented into the MMTP packet 619-1 and the MMTP packet 619-2, such that a value f_i of the MMTP packet 619-1 is set to 01 and the value f_i of the MMTP packet 619-2 is set to 11. The packet type included in each of the MMTP packet 619-1 and the MMTP packet 619-2 is set to an MPU, and the FT included in each of the MMTP packet 619-1 and the MMTP packet 619-2 is set to an MFU. Herein, the size of the MMTP packet 619-1 is 1500 bytes, and the size of the MMTP packet 619-2 is 1200 bytes.

Meanwhile, in FIG. 6, MPU metadata is located in the head portion of a packet, but the MPU metadata may be located in any portion of the packet such as the tail portion or the middle portion of the packet according to a need of the MMT communication system. For example, if some of MFUs included in a packet transmitted by an MMT sending entity fail to be received normally by an MMT receiving entity, a packet repair probability for a case where the MPU metadata is located at the tail portion of a packet is higher than that for a case where the MPU metadata is located at the head portion of the packet. Herein, the position of the MPU metadata in the packet may be determined based on various parameters, taking the decoding efficiency of the MMT receiving entity into account, and a detailed description of the various parameters will be omitted.

The process of transmitting a packet based on FT and f_i in the MMT communication system according to an embodiment of the present disclosure has been described with reference to FIG. 6, and next, referring to FIG. 7, a description will be made of a process of receiving a packet based on FT and f_i in the MMT communication system according to an embodiment of the present disclosure.

Figure 7:
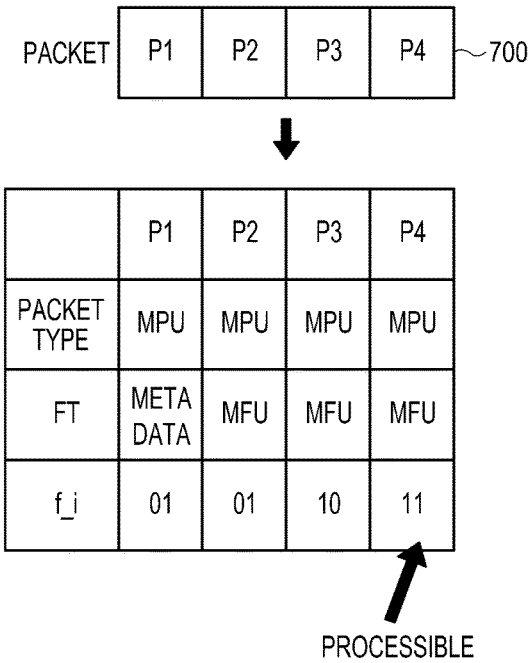
FIG. 7 illustrates an example of a process of receiving a packet based on FT and f_i in an MMT communication system according to an embodiment of the present disclosure.

FIG. 7 illustrates an example of a process of receiving a packet based on FT and f_i in an MMT communication system according to an embodiment of the present disclosure.

Referring to FIG. 7, in an MMT sending entity, a packet 700 is generated based on FT and f_i, taking MPU processing into account, and is generated for transmission of large-volume contents, e.g., 4K contents. That is, the packet 700 may include MPU metadata, at least one MFU, i.e., two MFUs. Herein, it is assumed that one of the two MFUs is fragmented into two MMTP packets, and the other MFU is not fragmented. In FIG. 7, an MMTP packet generated based on the MPU metadata is shown as P1, MMTP packets generated by fragmentation of an MFU are shown as P2 and P3, and an MMTP packet generated based on a non-fragmented MFU is shown as P4. Herein, P2 is an MMTP packet preceding P3. Herein, the MFU is assumed to be fragmented if a size thereof exceeds a size of an MTU, e.g., 1500 bytes.

Each of P1 through P4 includes a packet type, FT, and f_i. Since the MPU metadata is the start part of an MPU, a value f_i of P1 is set to 01. A packet type included in P1 is set to an MPU, and an FT included in P1 is set to metadata.

P2 and P3 are MMTP packets generated by segmentation of one MFU, and P2 is an MMTP packet preceding P3. Thus, a packet type included in P2 is set to an MPU, FT included in P2 is set to an MFU, and f_i included in P2 is set to 01.

A packet type included in P3 is set to an MPU, an FT included in P3 is set to an MFU, and f_i included in P3 is set to 10.

Since the MPU metadata is the last part of an MPU, a value f_i of P4 is set to 11. A packet type included in P4 is set to an MPU, and an FT included in P4 is set to an MFU.

If the MMT sending entity transmits a packet in the above-described manner, the MMT receiving entity may recognize that the packet, i.e., the last fragment of a data unit has been received based on the value f_i included in P4 upon completing reception of P4.

Thus, when the packet is transmitted MPU-by-MPU as described above with reference to FIG. 7, processing of the packet may start after completion of MPU-based packet reception. That is, when the packet is transmitted in the manner described with reference to FIG. 7, packet processing on a basis of an MPU having a large size may start.

Meanwhile, in FIG. 7, MPU metadata is located in the head portion of a packet, but the MPU metadata may be located in any portion of the packet such as the tail portion or the middle portion of the packet according to a need of the MMT communication system. For example, if some of MFUs included in a packet transmitted by an MMT sending entity fail to be received normally by an MMT receiving entity, a packet repair probability for a case where the MPU metadata is located at the tail portion of a packet is higher than that for a case where the MPU metadata is located at the head portion of the packet. Herein, the position of the MPU metadata in the packet may be determined based on various parameters, taking the decoding efficiency of the MMT receiving entity into account, and a detailed description of the various parameters will be omitted.

An example of the process of receiving a packet based on FT and f_i in the MMT communication system according to an embodiment of the present disclosure has been described with reference to FIG. 7, and next, referring to FIG. 8, a description will be made of another example of the process of receiving a packet based on FT and f_i in the MMT communication system according to an embodiment of the present disclosure.

Figure 8:
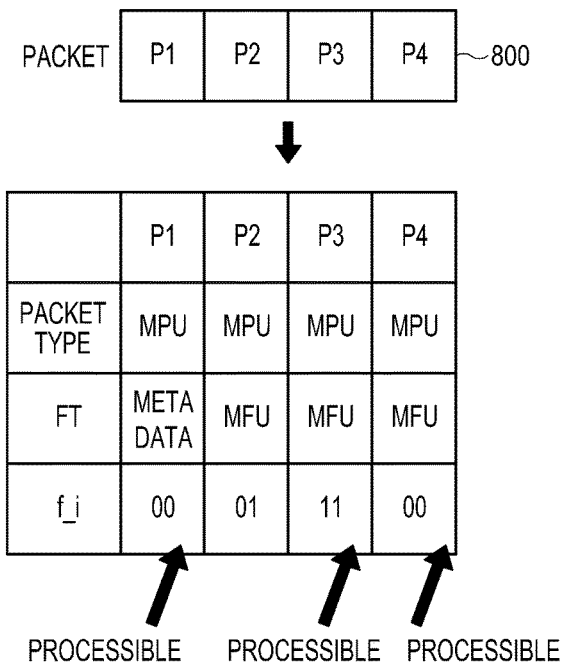
FIG. 8 illustrates another example of a process of receiving a packet based on FT and f_i in an MMT communication system according to an embodiment of the present disclosure.

FIG. 8 illustrates another example of a process of receiving a packet based on FT and f_i in an MMT communication system according to an embodiment of the present disclosure.

Referring to FIG. 8, in an MMT sending entity, a packet 800 is generated based on FT and f_i, taking MFU processing into account, and is generated for transmission of large-volume contents, e.g., 4K contents. That is, the packet 800 may include MPU metadata, at least one MFU, i.e., two MFUs. Herein, it is assumed that one of the two MFUs is fragmented into two MMTP packets, and the other MFU is not fragmented. In FIG. 8, an MMTP packet generated based on the MPU metadata is shown as P1, MMTP packets generated by fragmentation of an MFU are shown as P2 and P3, and an MMTP packet generated based on a non-fragmented MFU is shown as P4. Herein, P2 is an MMTP packet preceding P3. Herein, the MFU is assumed to be fragmented if a size thereof exceeds a size of an MTU, e.g., 1500 bytes.

Each of P1 through P4 includes a packet type, FT, and f_i. Since the MPU metadata is not fragmented, a value f_i of P1 is set to 00. A packet type included in P1 is set to an MPU, and an FT included in P1 is set to metadata.

P2 and P3 are MMTP packets generated by segmentation of one MFU, and P2 is an MMTP packet preceding P3. Thus, a packet type included in P2 is set to an MPU, FT included in P2 is set to an MFU, and f_i included in P2 is set to 01.

A packet type included in P3 is set to an MPU, an FT included in P3 is set to an MFU, and f_i included in P3 is set to 11.

Since P4 is not fragmented, a value f_i of P4 is set to 00. A packet type included in P4 is set to an MPU, and an FT included in P4 is set to an MFU.

If the MMT sending entity transmits a packet in the manner described above, that is, on an MFU basis, the MMT receiving entity may immediately start processing for non-fragmented P1 and P4. The MMT entity may start processing for fragmented P2 and P3 after completing reception of the last segment P3.

Thus, when the packet is transmitted MFU-by-MFU as described above with reference to FIG. 8, processing of the packet may start after completion of MFU-based packet reception. That is, when the packet is transmitted in the manner described with reference to FIG. 8, packet processing on a basis of an MFU having a small size may start. In this case, the packet may be processed at a higher decoding speed than MPU-based packet transmission described with reference to FIG. 7.

Meanwhile, in FIG. 8, MPU metadata is located in the head portion of a packet, but the MPU metadata may be located in any portion of the packet such as the tail portion or the middle portion of the packet according to a need of the MMT communication system. For example, if some of MFUs included in a packet transmitted by an MMT sending entity fail to be received normally by an MMT receiving entity, a packet repair probability for a case where the MPU metadata is located at the tail portion of a packet is higher than that for a case where the MPU metadata is located at the head portion of the packet. Herein, the position of the MPU metadata in the packet may be determined based on various parameters, taking the decoding efficiency of the MMT receiving entity into account, and a detailed description of the various parameters will be omitted.

Another example of the process of receiving a packet based on FT and f_i in the MMT communication system according to an embodiment of the present disclosure has been described with reference to FIG. 8, and next, referring to FIG. 9, a description will be made of an operation process of the MMT sending entity in the MMT communication system according to an embodiment of the present disclosure.

Figure 9:
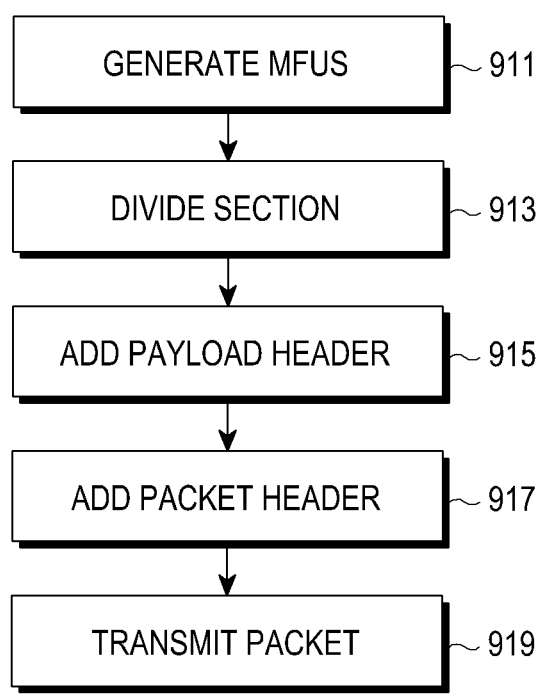
FIG. 9 illustrates an operation process of an MMT sending entity in an MMT communication system according to an embodiment of the present disclosure.

FIG. 9 illustrates an operation process of an MMT sending entity in an MMT communication system according to an embodiment of the present disclosure.

Referring to FIG. 9, the MMT sending entity generates MFUs in operation 911, and goes to operation 913. A scheme to generate MFUs by the MMT sending entity has already been described above, and thus will not be described at this time. The MMT sending entity divides each of the generated MFUs into at least two sections in operation 913 and goes to operation 915. The length of each section may be set to a fixed length or a variable length.

The MMT sending entity adds a payload header to each of the generated MFUs in operation 915 and goes to operation 917. If a section includes an MMT hint track, the section needs to indicate subsample_priority and dependency_counter from the MMT hint track. The MMT sending entity adds a packet header to each payload in operation 917 and goes to operation 919. The packet header has already been described above, and thus will not be described at this time. The MMT sending entity stores the generated packets, that is, MMTP packets in a buffer and transmits the packets to the MMT receiving entity in operation 919.

Although FIG. 9 illustrates an operation process of the MMT sending entity in the MMT communication system according to an embodiment of the present disclosure, various modifications may be made to FIG. 9. For example, consecutive operations are shown in FIG. 9, but those operations described with FIG. 9 may overlap, may be performed in parallel, may be performed in different orders, or may be performed multiple times.

The operation process of the MMT sending entity in the MMT communication system according to an embodiment of the present disclosure has been described with reference to FIG. 9, and next, referring to FIG. 10, a description will be made of an operation process of the MMT receiving entity in the MMT communication system according to an embodiment of the present disclosure.

Figure 10:
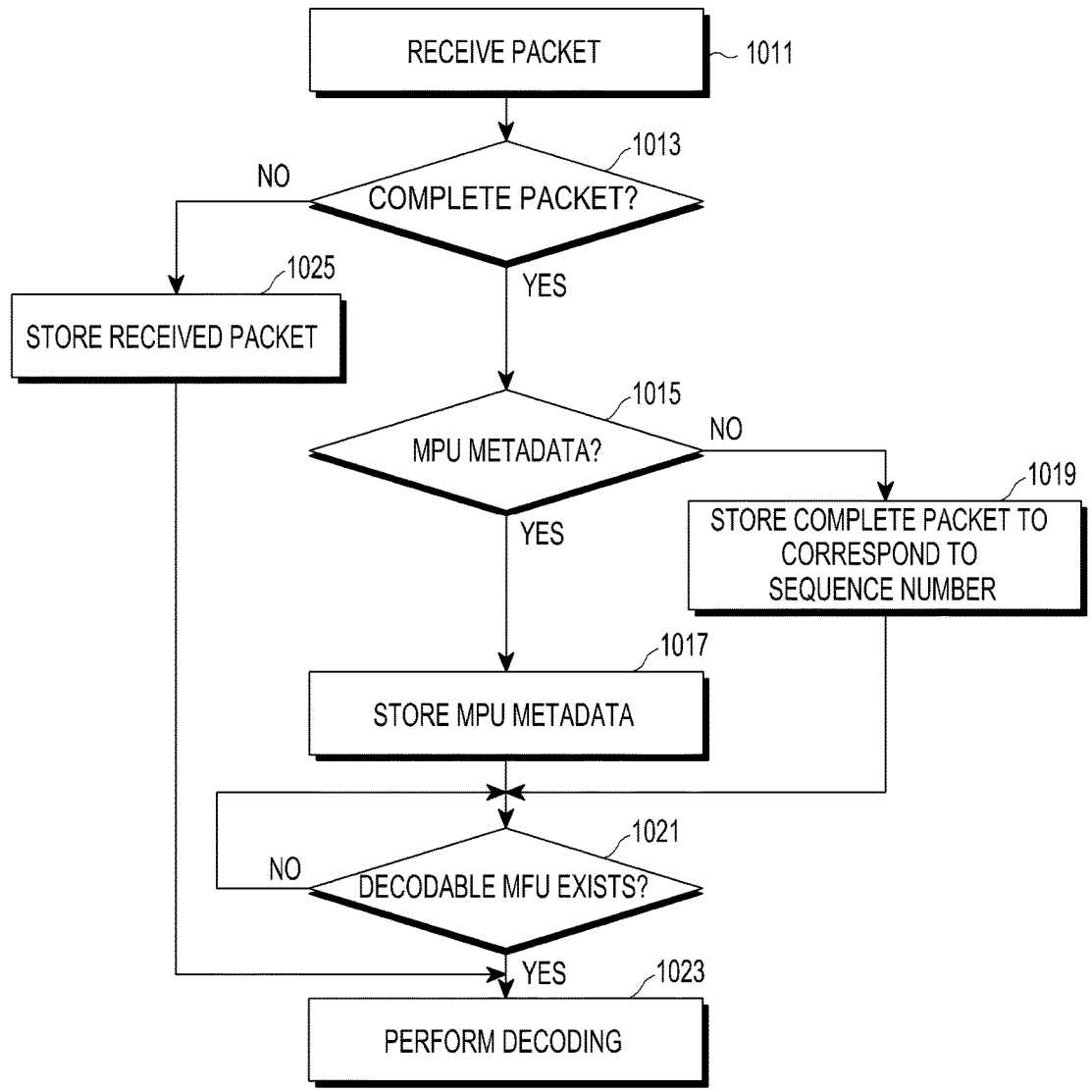
FIG. 10 illustrates an operation process of an MMT receiving entity in an MMT communication system according to an embodiment of the present disclosure.

FIG. 10 illustrates an operation process of an MMT receiving entity in an MMT communication system according to an embodiment of the present disclosure.

Referring to FIG. 10, the MMT receiving entity receives packets, that is, MMTP packets, from the MMT sending entity in operation 1011 and goes to operation 1013. The MMT receiving entity determines whether the received MMTP packets are complete MMTP packets in operation 1013. Herein, the MMT receiving entity may determine whether the received MMTP packets are complete MMTP packets, based on a value f_i included in each MMTP packet. That is, the MMT receiving entity may determine that an MMTP packet is a complete MMTP packet if the value f_i is 00 or 11.

If determining that the received MMTP packets are complete MMTP packets in operation 1013, the MMT receiving entity goes to operation 1015. The MMT receiving entity determines whether the complete MMTP packets are MPU metadata in operation 1015. If determining that the complete MMTP packets are MPU metadata, the MMT receiving entity goes to operation 1017. The MMT receiving entity stores the MPU metadata in a position preceding the complete MMTP packets stored in the buffer, which is the first position, in operation 1017 and goes to operation 1021. The buffer is assumed to be a buffer for MFU decoding, and a buffer for storing the received MMTP packets exists separately.

If determining that the complete MMTP packet is not MPU metadata in operation 1015, the MMT receiving entity goes to operation 1019. The MMT receiving entity detects a sequence number included in the complete MMTP packet and stores the complete MMTP packet in the buffer to correspond to the detected sequence number in operation 1019, and goes to operation 1021.

The MMT receiving entity determines whether there is a decodable MFU in operation 1021. If determining that there is a decodable MFU, the MMT receiving entity goes to operation 1023. The MMT receiving entity performs decoding with respect to the decodable MFU in operation 1023.

If determining that the received MMTP packets are not complete MMTP packets in operation 1013, the MMT receiving entity goes to operation 1025. The MMT receiving entity stores the received MMTP packets in the buffer for receiving the received MMTP packets in operation 1025, and goes to operation 1023.

Although FIG. 10 illustrates an operation process of the MMT receiving entity in the MMT communication system according to an embodiment of the present disclosure, various modifications may be made to FIG. 10. For example, consecutive operations are shown in FIG. 10, but those operations described with FIG. 10 may overlap, may be performed in parallel, may be performed in different orders, or may be performed multiple times.

The operation process of the MMT receiving entity in the MMT communication system according to an embodiment of the present disclosure has been described with reference to FIG. 10, and next, referring to FIG. 11, a description will be made of an internal structure of the MMT sending entity in the MMT communication system according to an embodiment of the present disclosure.

Figure 11:
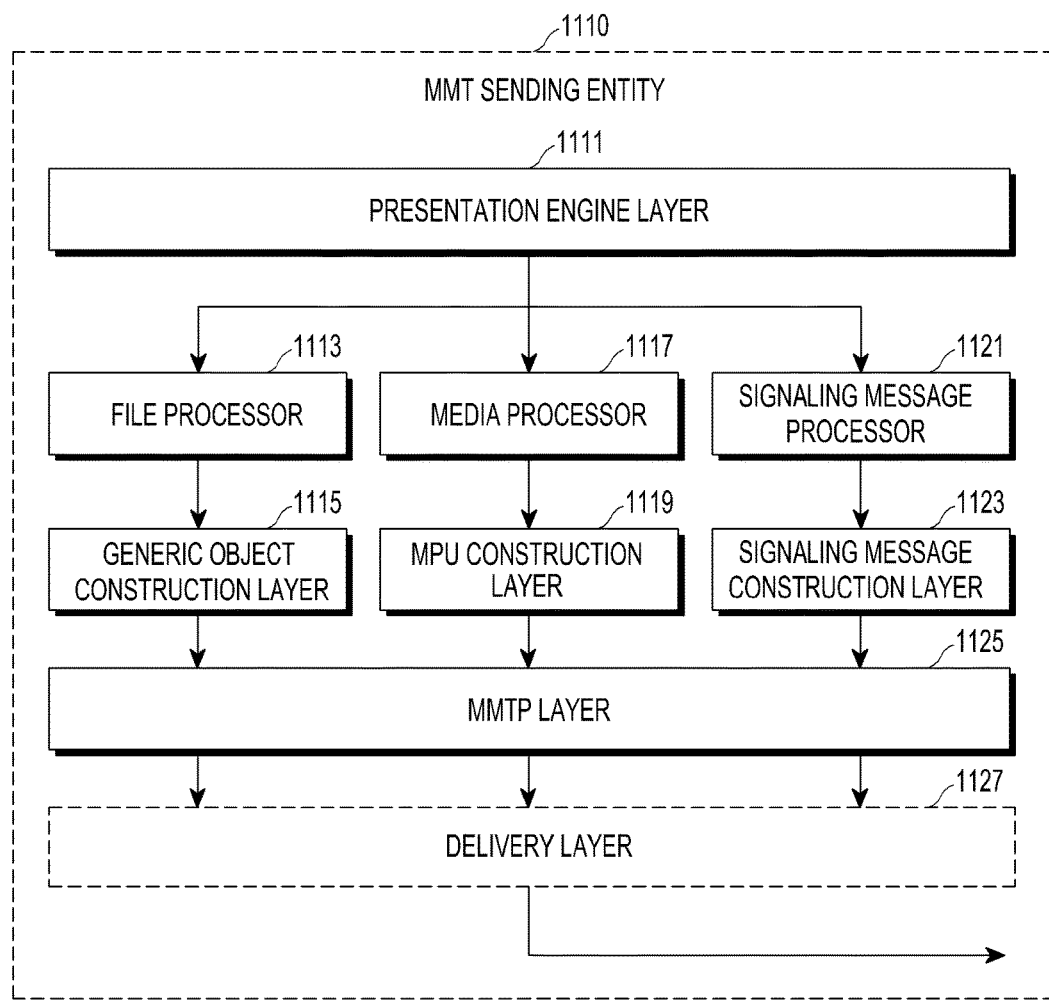
FIG. 11 illustrates an example of an internal structure of an MMT sending entity in an MMT communication system according to an embodiment of the present disclosure.

FIG. 11 illustrates an example of an internal structure of an MMT sending entity in an MMT communication system according to an embodiment of the present disclosure.

Referring to FIG. 11, an MMT sending entity 1100 may include a presentation engine layer 111, a file processor 1113, a generic object construction layer 1115, a media processor 1117, an MPU construction layer 1119, a signaling message processor 1121, a signaling message construction layer 1123, an MMTP layer 1125, and a delivery layer 1127.

The presentation engine layer 1111 sets up a multimedia scene.

The file processor 1113 processes a file, e.g., an MPU file, and the generic object construction layer 1115 constructs a generic object such as a complete MPU.

The media processor 1117 processes media data, the MPU construction layer 1119 constructs an MPU, and the signaling message processor 1121 performs a processing operation for a signaling message to be transmitted to the MMT receiving entity. The signaling message construction layer 1123 constructs a signaling message processed by the signaling message processor 1121.

The MMTP layer 1125 generates a streamed media based on various parameters such as packet_id, a payload type, and so forth. Herein, an encapsulation procedure is based on a delivered payload type, and is performed independently, and thus is not separately shown in FIG. 11.

The delivery layer 1127 converts the streamed media data generated in the MMTP layer 1125 into a form suitable for transmission to the MMT receiving layer, and then transmits the converted media data to the MMT receiving layer.

Meanwhile, in FIG. 11, the MMT sending entity 1100 is illustrated as being implemented with separate processors such as the presentation engine layer 1111, the file processor 1113, the generic object construction layer 1115, the media processor 1117, the MPU construction layer 1119, the signaling message processor 1121, the signaling message construction layer 1123, the MMTP layer 1125, and the delivery layer 1127, but at least two of the presentation engine layer 1111, the file processor 1113, the generic object construction layer 1115, the media processor 1117, the MPU construction layer 1119, the signaling message processor 1121, the signaling message construction layer 1123, the MMTP layer 1125, and the delivery layer 1127 may be integrated into one processor. The MMT sending entity 1100 may be implemented with one processor.

An example of the internal structure of the MMT sending entity in the MMT communication system according to an embodiment of the present disclosure has been described with reference to FIG. 11, and next, referring to FIG. 12, a description will be made of another example of the internal structure of the MMT sending entity in the MMT communication system according to an embodiment of the present disclosure.

Figure 12:
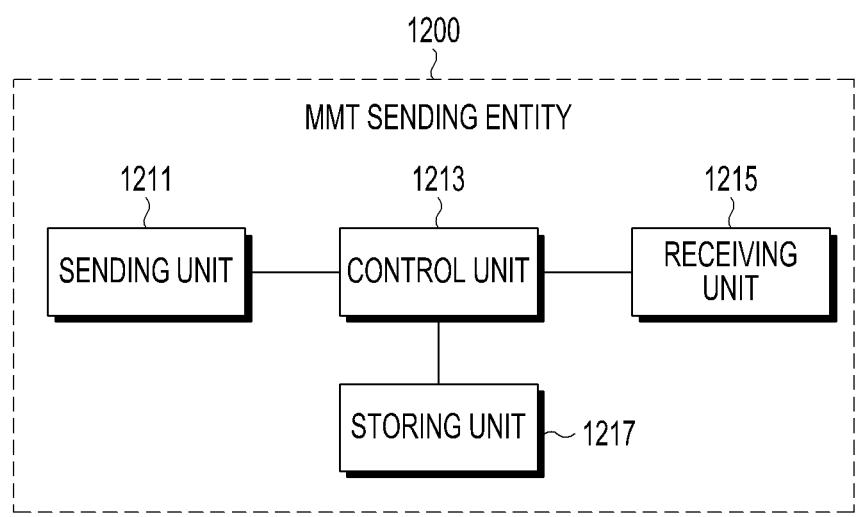
FIG. 12 illustrates another example of an internal structure of an MMT sending entity in an MMT communication system according to an embodiment of the present disclosure.

FIG. 12 illustrates another example of an internal structure of an MMT sending entity in an MMT communication system according to an embodiment of the present disclosure.

Referring to FIG. 12, an MMT sending entity 1200 may include a sending unit 1211, a control unit 1213, a receiving unit 1215, and a storing unit 1217.

The control unit 1213 controls an overall operation of the MMT sending entity 1200. The control unit 1213 controls the MMT sending entity 1200 to perform overall operations related to packet transmission/reception according to an embodiment of the present disclosure. Herein, the overall operations related to packet transmission/reception are the same as those described above with reference to FIGS. 1 through 10, and thus will not be described in detail at this time.

The sending unit 1211 transmits a message to the MMT receiving entity, etc., under control of the control unit 1213. Herein, various messages transmitted by the sending unit 1211 are the same as those described above with reference to FIGS. 1 through 10, and thus will not be described in detail at this time.

The receiving unit 1215 receives various messages from the MMT receiving entity, etc., under control of the control unit 1213. Herein, various messages received by the receiving unit 1215 are the same as those described above with reference to FIGS. 1 through 10, and thus will not be described in detail at this time.

The storing unit 1217 stores programs and various data necessary for operations of the MMT sending entity 1200, especially, information related to packet transmission/reception according to an embodiment of the present disclosure. The storing unit 1217 stores various messages received by the receiving unit 1215 from the MMT receiving entity.

In FIG. 2, the MMT sending entity 1200 is illustrated as being implemented with separate processors such as the sending unit 1211, the control unit 1213, the receiving unit 1215, and the storing unit 1217, at least two of the sending unit 1211, the control unit 1213, the receiving unit 1215, and the storing unit 1217 may be integrated into one processor. The MMT sending entity 1200 may be implemented with one processor.

Another example of the internal structure of the MMT sending entity in the MMT communication system according to an embodiment of the present disclosure has been described with reference to FIG. 12, and next, referring to FIG. 13, a description will be made of an example of an internal structure of the MMT receiving entity in the MMT communication system according to an embodiment of the present disclosure.

Figure 13:
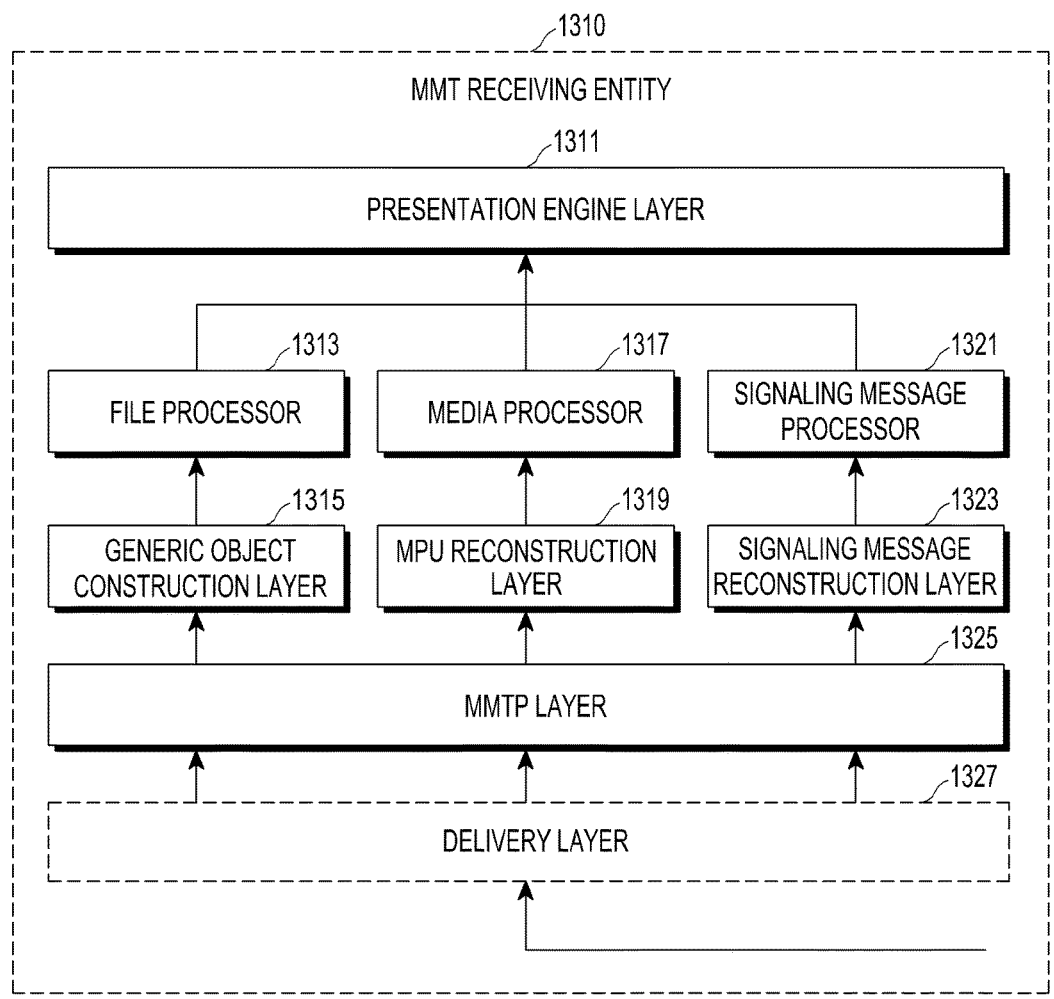
FIG. 13 illustrates an example of an internal structure of an MMT receiving entity in an MMT communication system according to an embodiment of the present disclosure.

FIG. 13 illustrates an example of an internal structure of an MMT receiving entity in an MMT communication system according to an embodiment of the present disclosure.

Referring to FIG. 13, an MMT receiving entity 1310 may include a presentation engine layer 1311, a file processor 1313, a generic object reconstruction layer 1315, a media processor 1317, an MPU reconstruction layer 1319, a signaling message processor 1321, a signaling message reconstruction layer 1323, an MMTP layer 1325, and a delivery layer 1327.

The MMT receiving entity operates in one or more MMT function regions (not shown separately in FIG. 13). The MMT function regions may include an MPU function region, a delivery function region, and a signaling function region. Herein, the MPU function region, the delivery function region, and the signaling function region will be described below.

First, the MPU function region defines a logical structure of media contents, a format of data units to be processed by the MMT entity, and instantiation thereof, e.g., generation of an instance having an ISO base media file format prescribed in the ISO/IEC 14496-12. The package provides components including the media content and essential information for improved delivery based on definition of relationships among the components. The format of the data units is defined to encapsulate encoded media data for storage or delivery and to consider a simple change between data to be stored and data to be delivered.

Second, the delivery function region defines an application layer transport protocol and a payload format. The application layer transport protocol provides improved characteristics of multimedia data delivery when compared to support of combined use of multiplexing and streaming and download delivery in general application layer transport protocols, e.g., in a single packet flow. The payload format is defined to enable transport of encoded media data that is agnostic to media types and encoding methods.

Third, the signaling function region defines formats of signaling messages that manage delivery and consumption of media data. The signaling messages for managing consumption are used to signal a structure of the package, and the signaling messages for managing delivery are used to signal a structure of the payload format and a protocol configuration.

The MMTP layer 1325 is used to receive and demultiplex a streamed media based on various parameters such as packet_id, a payload type, and so forth. Herein, a decapsulation procedure is based on a delivered payload type, and is performed independently, and thus is not separately shown in FIG. 13.

The presentation engine layer 1311 sets up a multimedia scene and refers to received contents by using the MMTP.

Meanwhile, in FIG. 13, the MMT receiving entity 1310 is illustrated as being implemented with separate processors such as the presentation engine layer 1311, the file processor 1313, the generic object reconstruction layer 1315, the media processor 1317, the MPU reconstruction layer 1319, the signaling message processor 1321, the signaling message reconstruction layer 1323, the MMTP layer 1325, and the delivery layer 1327, but at least two of the presentation engine layer 1311, the file processor 1313, the generic object reconstruction layer 1315, the media processor 1317, the MPU reconstruction layer 1319, the signaling message processor 1321, the signaling message reconstruction layer 1323, the MMTP layer 1325, and the delivery layer 1327 may be integrated into one processor. The MMT receiving entity 1310 may be implemented with one processor.

An example of the internal structure of the MMT receiving entity in the MMT communication system according to an embodiment of the present disclosure has been described with reference to FIG. 13, and next, referring to FIG. 14, a description will be made of another example of the internal structure of the MMT receiving entity in the MMT communication system according to an embodiment of the present disclosure.

Figure 14:
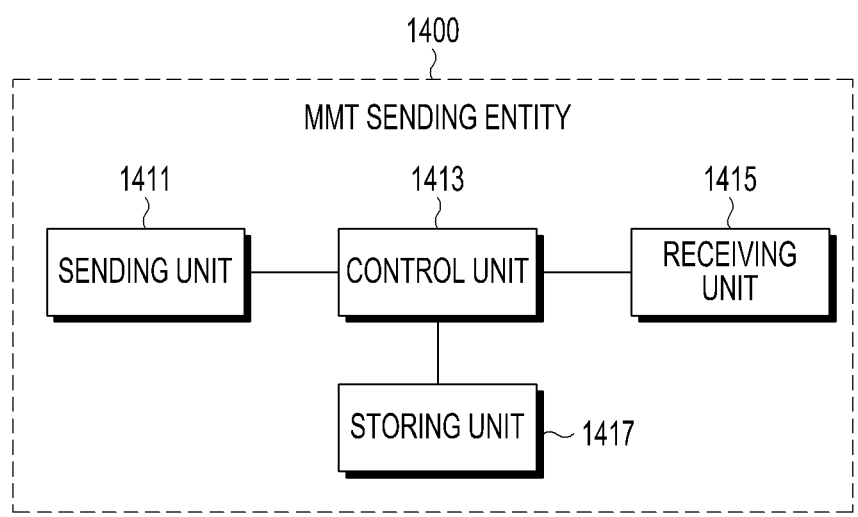
FIG. 14 illustrates another example of an internal structure of an MMT receiving entity in an MMT communication system according to an embodiment of the present disclosure.

FIG. 14 illustrates another example of an internal structure of an MMT receiving entity in an MMT communication system according to an embodiment of the present disclosure.

Referring to FIG. 14, an MMT receiving entity 1400 may include a sending unit 1411, a control unit 1413, a receiving unit 1415, and a storing unit 1417.

The control unit 1413 controls an overall operation of the MMT receiving entity 1400. The control unit 1413 controls the MMT receiving entity 1400 to perform overall operations related to packet transmission/reception according to an embodiment of the present disclosure. Herein, the overall operations related to packet transmission/reception are the same as those described above with reference to FIGS. 1 through 10, and thus will not be described in detail at this time.

The sending unit 1411 transmits a message to the MMT sending entity, etc., under control of the control unit 1413. Herein, various messages transmitted by the sending unit 1411 are the same as those described above with reference to FIGS. 1 through 10, and thus will not be described in detail at this time.

The receiving unit 1415 receives various messages from the MMT sending entity, etc., under control of the control unit 1413. Herein, various messages received by the receiving unit 1415 are the same as those described above with reference to FIGS. 1 through 10, and thus will not be described in detail at this time.

The storing unit 1417 stores programs and various data necessary for operations of the MMT receiving entity 1400, especially, information related to packet transmission/reception according to an embodiment of the present disclosure. The storing unit 1417 stores various messages received by the receiving unit 1415 from the MMT sending entity.

In FIG. 14, the MMT receiving entity 1400 is illustrated as being implemented with separate processors such as the sending unit 1411, the control unit 1413, the receiving unit 1415, and the storing unit 1417, at least two of the sending unit 1411, the control unit 1413, the receiving unit 1415, and the storing unit 1417 may be integrated into one processor. The MMT receiving entity 1400 may be implemented with one processor.

Particular aspects of the present disclosure may also be implemented as a computer readable code in a computer readable recording medium. The computer readable recording medium may be any type of data storage device that may store data readable by a computer system. Examples of record-mediums readable by the computer may include a read-only memory (ROM), a random-access memory (RAM), a compact disc-read only memory (CD-ROM), magnetic tapes, floppy disks, optical data storage devices, carrier waves (such as data transmission through the Internet). The computer readable recording medium may be distributed through computer systems connected over a network, and thus the computer readable code is stored and executed in a decentralized manner. Further, functional programs, codes and code segments for achieving the present disclosure may be easily interpreted by programmers skilled in the art which the present disclosure pertains to.

The apparatus and method according to an embodiment of the present disclosure may be implemented by hardware, software, or a combination of hardware and software. Such arbitrary software may be stored, for example, in a volatile or non-volatile storage device (e.g., a ROM, etc.), a memory (e.g., a RAM, a memory chip, a memory device, or a memory IC), or a machine (e.g., computer) recordable optical or magnetic storage medium (e.g., a CD, a DVD, a magnetic disc, a magnetic tape, etc.) regardless of its ability to erase or rewrite. It can be seen that the method according to the present disclosure may be implemented by a computer or a portable terminal which includes a controller and a memory, and the memory is an example of a machine-readable storage medium which is suitable for storing a program or programs including instructions for implementing the embodiment of the present disclosure.

Accordingly, the present invention includes a program that includes a code for implementing the apparatus and method set forth in the appended claims of the specification and a machine (computer, etc.) readable storage medium for storing the program. Furthermore, the program may be electronically transferred by an arbitrary medium, such as a communication signal transmitted through a wired or wireless connection, and the present invention appropriately includes equivalents of the program.

The apparatus according to an embodiment of the present disclosure may receive and store the program from a program providing device connected in a wired or wireless manner. The program providing device may include a memory for storing a program including instructions for instructing the apparatus to execute a preset method, information necessary for the method, a communication unit for performing wired or wireless communication with the apparatus, and a controller for transmitting a corresponding program to the apparatus at the request of the apparatus or automatically.

While embodiments of the present disclosure have been described, various changes may be made without departing the scope of the present disclosure. Therefore, the scope of the present disclosure should be defined by the appended claims and equivalents thereof, rather than by the described embodiments.

The invention claimed is:

1. A method for transmitting a packet by a transmitting device in a multimedia communication system, the method comprising:
   determining data to be included in a payload of the packet from a media processing unit (MPU) including MPU metadata, movie fragment metadata, and media data;
   when the data is determined as the MPU metadata, generating a first packet comprising a payload header and a payload, wherein the payload header includes a fragment type (FT) indicating that the data included in the payload is the MPU metadata and a fragmentation indication (f_i) indicating that the data included in the payload is a complete data unit which is not fragmented;
   when the data is determined as the movie fragment metadata, generating a second packet comprising a payload header and a payload, wherein the payload header includes a FT indicating that the data included in the payload is the movie fragment metadata and a f_i indicating that the data included in the payload is the complete data unit which is not fragmented;
   when the data is determined as the media data, generating a third packet comprising a payload header and a payload, wherein the payload header includes a FT indicating that the data included in the payload is the media data and a f_i related to the data included in the payload; and
   transmitting one of the first packet, the second packet and the third packet,
   wherein the generating of the third packet further comprises:
      determining whether to fragment a media data unit for the media data,
      when the media data unit is determined to be fragmented, fragmenting the media data unit into a plurality of fragments, determining the f_i indicating a position of a fragment to be included in the payload of the packet among the plurality of the fragments, generating the third packet comprising the payload header and the payload, wherein the payload header includes the FT indicating that the data included in the payload is the media data and the determined f_i, and the payload includes the fragment,
      when the media data unit is determined to not be fragmented, generating the third packet comprising the payload header and the payload, wherein the payload header includes the FT indicating that the data included in the payload is the media data and the determined f_i indicating that the data included in the payload is the complete data unit which is not fragmented, and the payload includes the media data unit, and
      when the fragment is included in the payload of the third packet, the f_i included in the payload header of the third packet indicates whether the fragment is a first fragment, a last fragment, or an intermediate fragment among the plurality of the fragments.

2. A method for receiving a packet by a receiving device in a multimedia communication system, the method comprising:
   receiving a packet comprising a packet header including a fragment type (FT), a fragmentation indicator (f_i), and a payload including data;
   obtaining the FT and the f_i from the received packet;
   determining whether to process the data included in the payload based on the obtained FT and the obtained f_i;
   when the obtained FT indicates that the data included in the payload is media processing unit (MPU) metadata or movie fragment metadata, determining that processing of the data is possible; and
   when the obtained FT indicates that the data included in the payload is media data and the obtained f_i indicates that the data is a complete data unit which is not fragmented or the data is a last fragment among a plurality of fragments that is fragmented a media data unit, determining that processing of the data is possible.

3. A transmitting device in a multimedia communication system, the transmitting device comprising:
   a transceiver configured to transmit and receive a signal; and
   at least one processor;
   wherein the at least one processor is configured to:
      determine data to be included in a payload of the packet from a media processing unit (MPU) including MPU metadata, movie fragment metadata and media data,
      when the data is determined as the MPU metadata, generate a first packet comprising a payload header and a payload, wherein the payload header includes a fragment type (FT) indicating that the data included in the payload is the MPU metadata and a fragmentation indication (f_i) indicating that the data included in the payload is a complete data unit which is not fragmented,
      when the data is determined as the movie fragment metadata, generate a second packet comprising a payload header and a payload, wherein the payload header includes a FT indicating that the data included in the payload is the movie fragment metadata and a f_i indicating that the data included in the payload is the complete data unit which is not fragmented,
      when the data is determined as the media data, generate a third packet comprising a payload header and a payload, wherein the payload header includes a FT indicating that the data included in the payload is the media data and a f_i related to the data included in the payload, and
      transmit one of the first packet, the second packet and the third packet, wherein, when the at least one processor generates the third packet, the at least one processor is configured to:
  determine whether to fragment a media data unit for the media data,
  when the media data unit is determined to be fragmented, fragment the media data unit into a plurality of fragments, determine the f_i indicating a position of a fragment to be included in the payload of the packet among the plurality of the fragments, generate the third packet comprising the payload header and the payload, wherein the payload header includes the FT indicating that the data included in the payload is the media data and the determined f_i, and the payload includes the fragment,
  when the media data unit is determined to not be fragmented, generate the third packet comprising the payload header and the payload, wherein the payload header includes the FT indicating that the data included in the payload is the media data and the determined f_i indicating that the data included in the payload is the complete data unit which is not fragmented, and the payload includes the media data unit, and
  when the fragment is included in the payload of the third packet, the f_i included in the payload header of the third packet indicates whether the fragment is a first fragment, a last fragment, or an intermediate fragment among the plurality of the fragments.

4. A receiving device in a multimedia communication system, the receiving device comprising:
  a transceiver configured to transmit and receive a signal; and
  at least one processor; and
  wherein the at least one processor is configured to:
    receive a packet comprising a packet header including a fragment type (FT) and a fragmentation indicator (f_i) and a payload including data,
    obtain the FT and the f_i from the received packet,
    determine whether to process the data included in the payload based on the obtained FT and the obtained f_i,
    when the obtained FT indicates that the data included in the payload is media processing unit (MPU) metadata or movie fragment metadata, determine that processing of the data is possible, and
    when the obtained FT indicates that the data included in the payload is media data, the obtained f_i indicates that the data is a complete data unit which is not fragmented or the data is a last fragment among a plurality of fragments that is fragmented a media data unit, determine that processing of the data is possible.

* * * * *